United States Patent [19]

La Mers

[11] 4,454,180

[45] Jun. 12, 1984

[54] LABELLING SYSTEM

[76] Inventor: Herbert La Mers, 2317 La Palma Dr., Ventura, Calif. 93003

[21] Appl. No.: 357,921

[22] Filed: Mar. 15, 1982

Related U.S. Application Data

[60] Continuation of Ser. No. 134,626, Mar. 27, 1980, abandoned, which is a division of Ser. No. 866,455, Jan. 3, 1978, Pat. No. 4,217,164, which is a continuation of Ser. No. 618,690, Oct. 10, 1975, abandoned.

[51] Int. Cl.[3] .......................... B32B 3/16; G09F 3/02; G09F 3/10

[52] U.S. Cl. ....................................... 428/42; 40/2 R; 156/252; 156/DIG. 33; 283/81; 428/136; 428/138; 428/352

[58] Field of Search ............... 156/252, 253, 267, 268, 156/541, DIG. 33; 40/2 R; 428/42, 136, 138, 352; 283/81

[56] References Cited

U.S. PATENT DOCUMENTS 2,304,787 12/1942 Avery ................................ 156/584

3,169,895 2/1965 Sohn .......................... 156/DIG. 33

3,960,642 6/1976 Hamisch, Jr. et al. ............ 156/540

FOREIGN PATENT DOCUMENTS 1057126 2/1967 United Kingdom .

*Primary Examiner*—Michael G. Wityshyn

*Attorney, Agent, or Firm*—Freilich, Hornbaker, Rosen & Fernandez

[57] ABSTRACT

An elongated label strip suitable for use with motor driven first and second sprocket rollers for sequentially delivering labels to a mechanism operable to apply each delivered label to an object conveyed therepast. The label strip includes first and second elongated carrier strip portions positioned parallel to and closely spaced from one another to define a separation line between adjacent edges. Each carrier strip portion defines a plurality of uniformly spaced cuts therein aligned parallel to the separation line for cooperatively receiving the sprockets of one of said rollers. A multiplicity of labels is carried by and spaced along the carrier strip portions with each label being releasably adhered to both the first and second carrier strip portions so as to bridge the separation line therebetween.

4 Claims, 29 Drawing Figures

LABELLING SYSTEM

This is a continuation of application Ser. No. 134,626, filed Mar. 27, 1980, now abandoned, which was a divisional application of Ser. No. 866,455, filed Jan. 3, 1978, now U.S. Pat. No. 4,217,164, issued Aug. 12, 1980 which was a Continuation application of Ser. No. 618,690, filed Oct. 10, 1975, now abandoned.

This invention relates to improvements in label applying machinery.

All previous and presently known machinery for applying pressure sensitive labels to an article use the same kind of carrier web for the labels, and the same kind of label removing method.

The conventional carrier web consists of a series of labels with a viscous (pressure sensitive) adhesive applied to a carrier strip of paper which has been coated on the label supporting side with a release agent. The labels are spaced along the strip, and the unneeded waste (or matrix) from which the labels have been die cut is always removed during manufacture.

The labels are moved sequentially by pulling the carrier strip around a relatively sharp edge under tension. The label, because of its stiffness, releases from the carrier web and continues in a straight line over the edge rather than bend sharply and follow the carrier web.

This established method has a number of drawbacks:

(1) The need to remove all the waste or matrix from between and around labels during manufacture, because its presence tends to hold labels in place during peeling.

This waste removal requirement makes the labels cost much more, because it limits the printing and die cutting speed severely and because a great deal of costly extra material has to be added around each label to make the ladderlike waste strip strong enough to remove by pulling it free after die cutting on a printing press.

(2) The label peeling process used in all previous labelling machines requires pulling the web under high tension over a relatively sharp edge. Tiny cuts or nicks caused by the die cutting and slitting weaken the web and it frequently breaks, especially at high speed.

(3) Small invisible interruptions in the release coating are common. Through them the label adhesive is able to adhere strongly to the unprotected carrier web. When this occasionally occurs at the leading edge of a label, it will not peel but will follow the carrier strip around evan a sharp edge. The same can happen when the adhesive is cold, or too old.

(4) The need for great stiffness in the label material prevents the use of many desired materials such as plastics, or very thin labels, or very soft and pliant labels.

(5) During the peeling process, labels are being projected beyond the peeling edge and are essentially unsupported, except occasionally on one side (opposite the adhesive). They are easily disturbed and deflected by small irregularities, tramp particles of adhesive, air currents, or static electricity.

(6) The means of actually applying the labels varies, including a blast of air (inaccurate at any distance and does not apply labels firmly), a roller (inaccurate), and a plunger (too rigid and destructive on moving products).

(7) Automatic labelling machinery is very costly, partly because of sophisticated electronic label sensing and web control systems within the labeller.

It should be appreciated therefore that a label carrying arrangement and apparatus for applying labels therefrom to goods, which permits the use of very thin and soft labels as well as stiffer labels, which permits the use of lower cost label strips, and which permits label application at higher speeds and with greater reliability than presently known systems would be most desirable.

SUMMARY OF THE INVENTION

In accordance with one embodiment of the present invention, a label carrying arrangement and apparatus for applying the labels to goods is provided, which permits the use of a wide variety of labels, and which permits the application of the label at high speed and with high reliability to the goods. The label carrying arrangement includes a carrier strip with labels spaced therealong that have adhesive on their rear faces. The carrier strip has a separation line along a middle portion thereof which divides it into a pair of carrier strip portions. The label applying apparatus includes a label separator device with a substantially V-shaped notch at one end that forms a pair of separator edges. The carrier strip with labels thereon is guided up to the V-shaped notch, and the two carrier strip portions are pulled around a different one of the edge portions of the V to separate the strip portions from one another and from the label. A matrix of label material, from which the label was cut, can be left on the carrier strip and separated from the labels at the same time as the labels are separated from the carrier strip. Apparatus is also provided to engage the labels and press them against goods to be labelled.

Apparatus for engaging the labels and pressing them against the goods includes a bellows with holes in its face, and a pressure control for applying a vacuum or pressured air to the inside of the bellows. The bellows is pressed against the label as the label approaches or begins passing over the V-shaped notch and a vacuum is applied to the bellows to hold the label to the face thereof. The bellows moves with the label across the V-shaped notch while the vacuum continues to be applied, until the bellows and label have passed clear of the backing strip. Pressured air is then applied to the bellows to cause it to extend so that its face, with the label thereon, is thrust against an article to be labelled.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
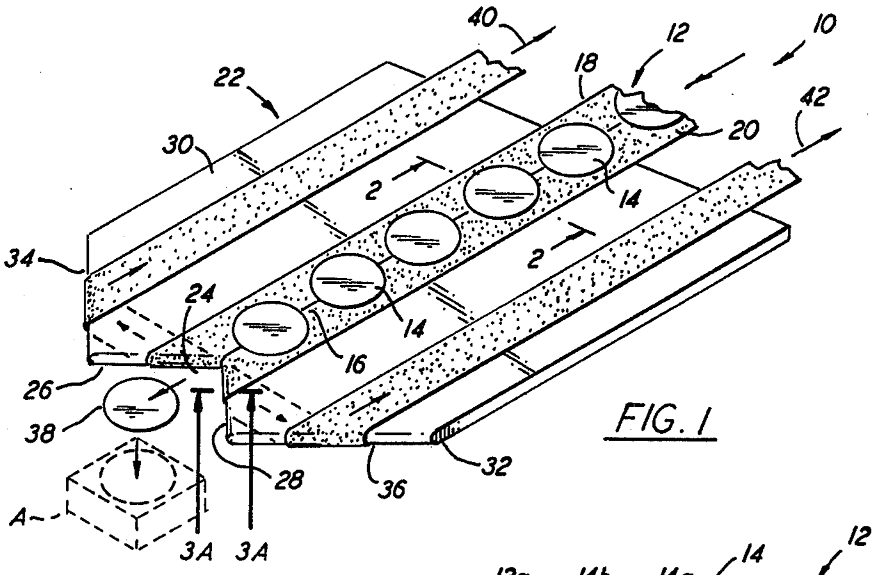
FIG. 1 is a partial perspective view of a labelling system constructed in accordance with one embodiment of the present invention.
Figure 3A:
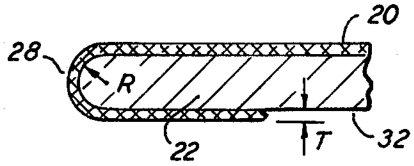
FIG. 3A is a view taken on the line 3A—3A of FIG. 1.
Figure 2:
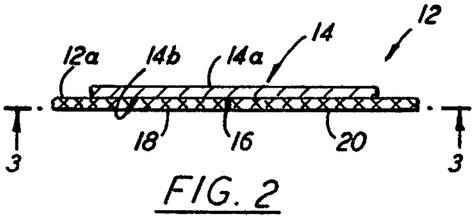
FIG. 2 is a view taken on the line 2—2 of FIG. 1, showing details of a label carrying arrangement thereof.
Figure 3:
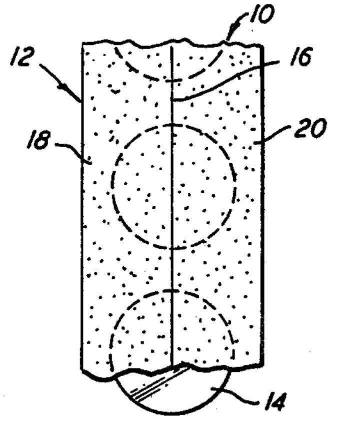
FIG. 3 is a view taken on the line 3—3 of FIG. 2.

FIGS. 1–3 illustrate details of a label carrying arrangement 10 of the invention, which includes an elongated backing web or carrier strip 12 and a multiplicity of labels 14 spaced along the length of the carrier strip. Each of the labels 14 has a front face 14*a* with a decorative design or other marking printed thereon, and a rear face 14*b* with contact adhesive thereon. The carrier strip has a front face 12*a* with release coating, such as silicone, which facilitates stripping of the label adhesive from the carrier strip. The carrier strip 12 includes a separation line 16 extending along its length at a middle portion thereof, to divide the carrier strip into two carrier strip portions 18, 20 that support different portions of the label 14.

Apparatus shown in FIG. 1 for stripping the labels 14 from the carrier strip 12 includes a label stripper or separator in the form of a plate 22 having a substantially V-shaped edge region or notch 24 which forms a pair of separator edges 26, 28. The carrier strip with the labels thereon initially moves along an upper face 30 of the label separator towards the V-shaped edge portion or region 24, with the separation line 16 aligned with the bottom of the V. Each of the carrier strip portions 18, 20 extends around a different one of the separator edges 26, 28, so that the carrier strip is pulled apart thereat. The strip portion 18 which extends around the separator edge 26, moves along the underside or lower face 32 of the plate, extends around an auxiliary guide edge 34, and then extends along the upper face 30 of the separator plate. The other carrier strip portion 20 extends in a corresponding manner, around the separator edge 28, around another auxiliary guide edge 36, and then along the upper face of the separator plate. It can be seen that as each label 14 moves into the V-shaped notch 24, the two carrier strip portions 18, 20 are directed downwardly and apart from each other, so that the label tends to continue to move in the direction of arrow 38. The label cannot follow the two halves of the carrier strip through the notch. As shown in FIG. 3A, the radius of curvature R of each edge, such as 28, need not be sharp. Instead, the radius R is greater than the thickness T of the carrier strip, which minimizes the possibility of tearing the carrier strip. If desired, the separator edges need not be stationary but may be rollers of suitable diameter.

In order to advance the label carrying arrangement 10, it is necessary only to pull the two carrier strip portions 18, 20 along the paths of the arrows 40, 42. The labels 14 on the carrier strip 12 will then move beyond the V-shaped edge region 24 and become separated from the carrier strip. Of course, in order to apply the labels to articles indicated at A, it is necessary to provide a means for reliably moving the freed labels against the articles. A labelling machine, to be described below, provides a plunger which engages the labels and reliably applies them to the goods.

FIGS. 4–9 illustrate details of a labelling machine 50 which moves the label strip 10 to apply the labels 14 thereon against articles A. The labelling machine 50 includes a frame 52 with an upstanding center wall 54, a label guiding and moving apparatus 56 on the first side of the upstanding wall 54, and drive and control apparatus 58 on the other side of the upstanding wall. The label guiding and moving apparatus 56 includes a supply reel 60 rotatably mounted on the frame and carrying a roll of the label strip 10. The label is guided from the reel 60 around a guide roll 62 and past a spring strip 63, around a feed roll 64, and along the upper side of the separator plate 22 towards the V-shaped edge region 24 thereof. The two carrier strip portions 18, 20 which have been separated at the V-shaped edge region 24, are pulled along their respective paths by a pair of tensioning rollers 66, 68. After passing through the tensioning rollers 66, 68, the two carrier strip postions 18, 20 may be directed into a bin for later disposal.

Figures 7, 8:
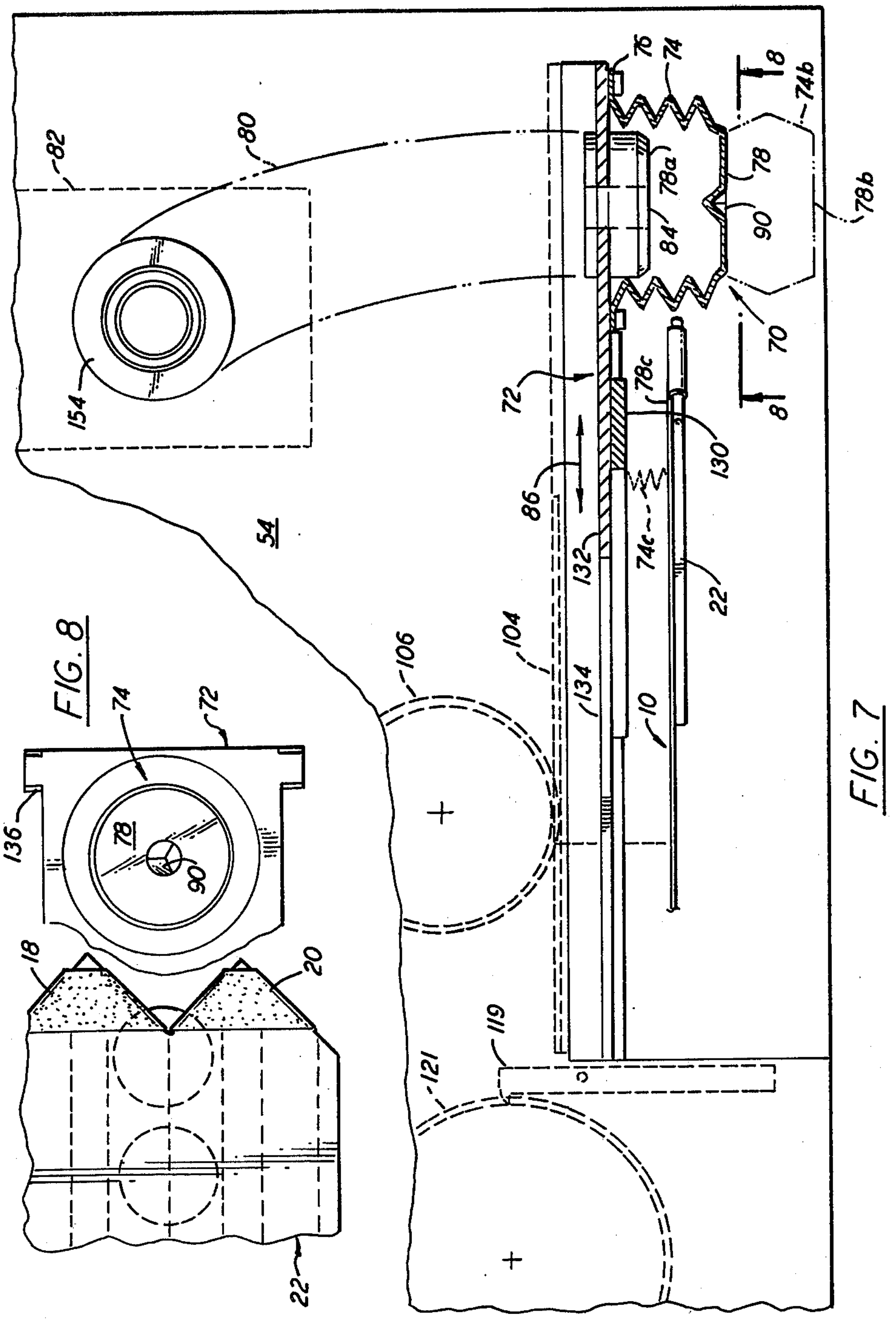
FIG. 7 is a partially sectional side view of the system of FIG. 4 and shows other details thereof.
FIG. 8 is a view taken on the line 8—8 of FIG. 7.

A plunger apparatus 70 which is disposed near the V-shaped groove 24 of the separator plate, serves to engage each label before, during, and after its separation from the carrier strip, and to carry that label against an article A, so that the adhesive-bearing face of the label is pressed against the article. The articles are carried on a conveyor apparatus C past the labelling machine, and movement of the plunger 70 is timed so that a label is applied to each article passing thereby. As illustrated in FIG. 7, the plunger apparatus 70 includes a plunger or bellows supporting plate 72 and a bellows 74 with an inner portion 76 fixed to the plunger supporting plate and an outer end face 78. A flexible hose 80 extends from a pressure control 82 to a tubular coupling 84 which opens to the inside of the bellows 74. The pressure control 82 can supply a low pressure which is less than atmospheric or vacuum, through the tube 80 to the bellows 74 to contract the bellows from the relaxed position shown at 74 to a contracted position wherein its end face is at 78*a*. Alternatively, pressure control 82 can supply pressured air through the hose 80 to the bellows 74 to expand the bellows to the configuration indicated at 74*b* wherein the end face has been thrust out to the position 78*b*. When a label lies against the end face 78 and air pressure is applied to the bellows, its end face 78 pushes the label against an article.

The bellows support plate 72 can move substantially longitudinally as indicated by arrows 86. Thus, the plate 72 can move the bellows 74, in its contracted position, rearwardly to the position indicated at 74*c* wherein the face of the bellows at 78*c* lies over the next label to be separated from the backing strip. Thereafter, the bellows support plate moves down so the bellows engages a label, and the support plate advances the bellows 74 in synchronism with advancement of the label strip 10 so that the bellows face 78 moves with the label while the label is being completely separated from its carrier strip. The bellows is then extended towards the position 74*b* to press the label against an article that is to be labelled.

In order to securely hold a label against the bellows face 78 prior to applying the label to an article, and to then reject the label from the bellows face as the bellows withdraws from the article, the bellows face 78 is provided with slits that form a hole 90, as shown in FIG. 8. the hole permits a low rate of air movement through the face into the bellows, when a vacuum has been applied through the tube 80 to the bellows. A vacuum is applied to the bellows to hold it in a contracted state while it is first pressed against a label at the position 74*c* in FIG. 7. The vacuum continues to be applied while the bellows moves with the label as the label separates from carrier strip and passes off the V-shaped edge of the separator plate 22. The vacuum not only keeps the bellows contracted, but also serves to hold the label firmly against the face of the bellows. When the bellows lies opposite the article to be labelled, pressured gas such as air is suddenly applied to the bellows. The pressured air causes the bellows to expand towards the configuration 74*b* to press against the article.

For the application of thin flexible labels, and where precise location of the label on the article is not important, the hole 90 is formed so that some air leaks out. The pressured air tends to reject the label from the face 78 of the bellows, but it does not matter if the label flies off the bellows even as it is moving towards the article if the distance to the article is not great. The pressured air rejection of the label helps in preventing the label from sticking to the bellows as the bellows contracts and draws away from the article. The bellows normally begins to withdraw from the article as the pressure therein is reduced but is still at a substantial level, inasmuch as the completely unpressured bellows tends to assume a configuration wherein its face is at 78 when pressure in the bellows reaches the atmospheric value.

Figures 9, 12, 13:
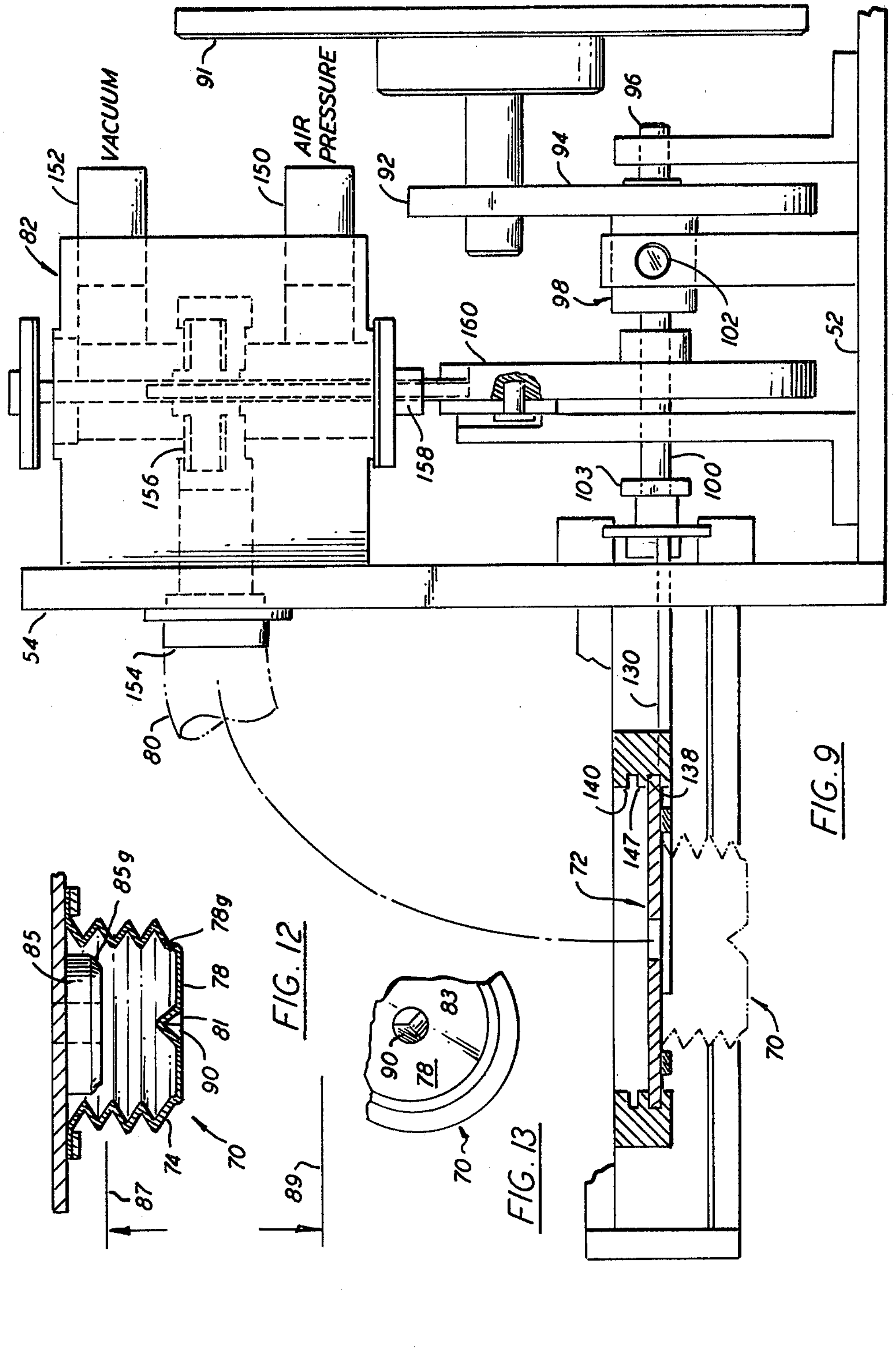
FIG. 9 is a front elevation view of the system of FIG. 4.
FIG. 12 is a sectional front view showing the bellows of the apparatus of FIG. 9.
FIG. 13 is a bottom view of the bellows of FIG. 12.

FIG. 12 illustrates the shape of the bellows 74 in its relaxed state. The bellows is molded of elastomeric material, with a recess 81 in the bellows face, and with three slits cut into the recessed portion to form the hole 90. The recess forms three flaps 83 which can readily bend inwardly but not outwardly. Accordingly, when a vacuum is applied to the bellows, air can pass into the bellows through the hole 90. However, when pressured air is applied inside the bellows, the flaps 83 tend to press against one another to close the hole and minimize the escape of air from the bellows. The flaps 83 therefore form a check valve which couples the face of the bellows to the inside thereof, to allow air flow substantially only in a direction into the bellows.

When the bellows contracts, the inside of the bellows end contacts a substantially rigid internal member 85 that limits the contraction of the bellows. The internal member 85 has a guide surface 85*g* which engages a correspondingly shaped surface 78*g* of the bellows end to not only limit the longitudinal contraction of the bellows end, but also to laterally position it. As a result, the bellows begins each expansion from the same lateral position and orientation. This results in the bellows tending to extend along the same path each time, to provide greater accuracy in the positioning of the labels on the articles When the bellows is contracted, its end face lies at the plane 87, while when fully extended without an article in the way the bellows can expand to the plane 89. Normally, an article is positioned about three quarters of the distance from the plane 87 to the plane 89. In examining causes for erratic directions of bellows expansion, it has been found that one cause is that the folds of the bellows may tend to stick to one another when compressed during the application of vacuum in the bellows. When the bellows begins expanding, locations which tended to stick together, tend to resist extension and the bellows tends to curve as it expands. It has been found that the application of release powder such as is used in plastic injection molding, eliminates the sticking problem, the powder being applied to both the inside and outside of the bellows fold. It has been found that the release powder remains in place during long continuous use of the bellows.

Figure 5:
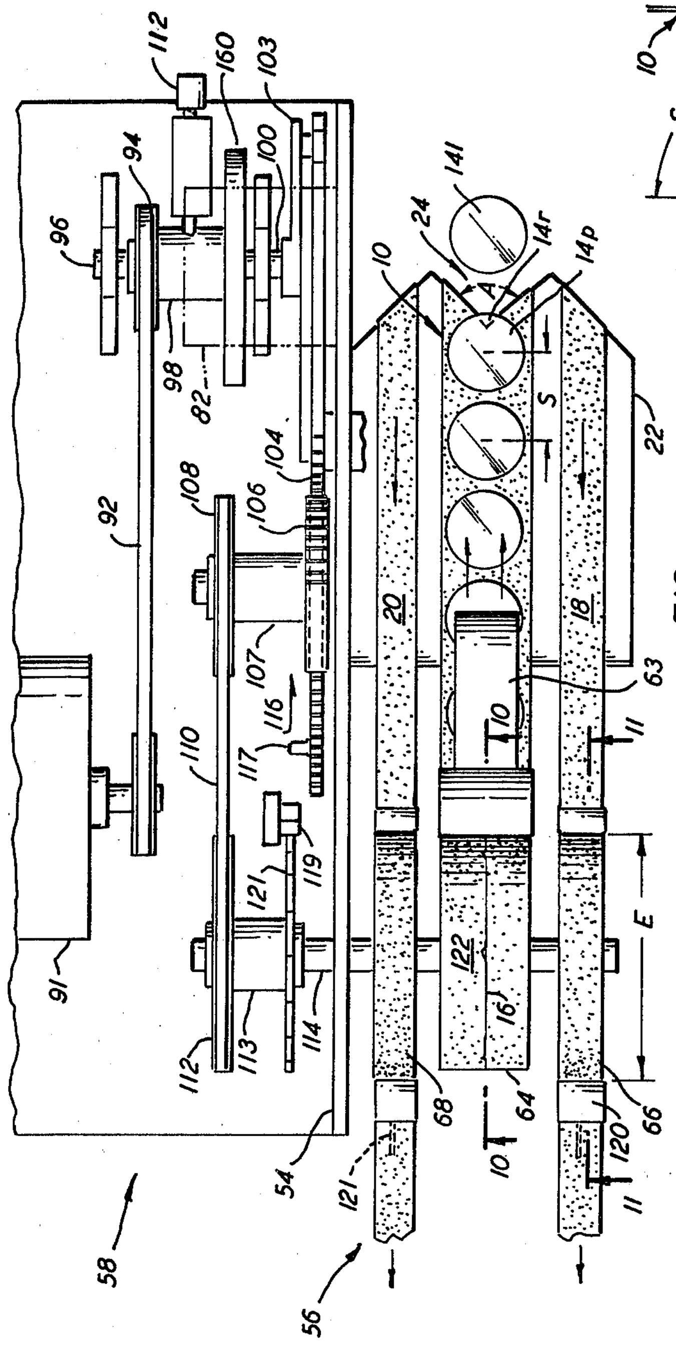
FIG. 5 is a partially sectional plan view of the system of FIG. 4.

As illustrated in FIGS. 5 and 9, the apparatus for advancing the label carrying arrangement includes a motor 91 which is coupled through a belt 92 to a pulley 94. The pulley shaft 96 is coupled through a single cycle clutch 98 to a drive shaft 100. The single cycle clutch 98 merely permits operation of the machine one cycle at a time, the drive shaft 100 rotating only one revolution each time a pin 102 is pulled out and released, but the shaft 100 rotating continuously if the pin 102 is retained in a pulled-out condition. The drive shaft 100 rotates a crank 103 that drives a rack or slide 104 back and forth. The slide 104 has gear teeth engaged with a gear 106 that is coupled through an overruning clutch 107 to a sprocket wheel 108, so that the sprocket wheel 108 turns in only one direction. This sprocket wheel 108 is coupled by a timing belt 110 to another sprocket wheel 112 which drives another single cycle clutch 113. The single cycle clutch drives a toothed wheel 121 and a feed shaft 114. The feed roll 64, which pulls the label strip 10 off the supply reel, is fixed to and driven by the feed shaft 114. The single cycle clutch is enabled to turn the feed shaft when a pin 117 on the slide 104 hits a pawl 119 to pivot the pawl out of engagement with the toothed wheel 121 on the feed shaft, which releases the single cycle clutch for turning the feed shaft 114. Thus, the feed roll 64 cannot turn until a predetermined time in each cycle. The feed roll can then rotate just enough to advance the label strip 10 by a distance S equal to the center-to-center distance of the labels along the strip. The slide 104, at that time, will have moved pin 117 out of engagement with the pawl 119, which stops further rotation of the wheel 121 and feed shaft 114.

Figure 11:
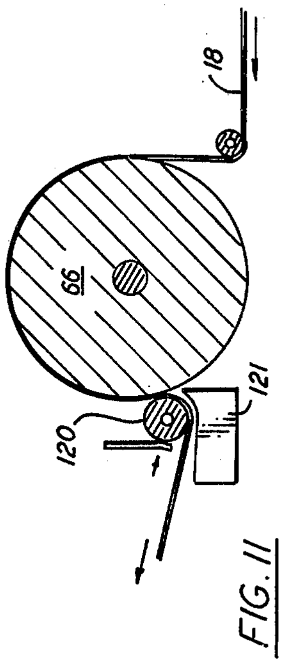
FIG. 11 is a view taken on the line 11—11 of FIG. 5.

The two tensioning rollers 66, 68 which pull the carrier strip portions, are fixed to the same feed shaft 114 to which the feed roll 64 is fixed. Therefore, as the feed roll 64 feeds the label strip 10 towards the V-shaped notch 24 where the labels are separated from the carrier strip, the tensioning rolls 66, 68 turn in unison to pull the carrier strip portions 18, 20 to thereby pull the label strip over the edges of the notch 24. In order to assure tension in the carrier strip portions 18, 20, the two tensioning rollers 66, 68 are constructed with a diameter E slightly larger than the diameter of the feed roll 64, resulting in the surfaces of the tensioning rolls 66, 68 turning slightly faster than the surface of the feed rolls 64. The tension rolls 66, 68 are in the form of rubber tires that permit slippage of the carrier strip portions 18, 20 thereon, so that the strip portions are pulled to maintain tension but are not pulled so hard as to tear them. As shown in FIG. 11, backing rolls 120 are provided to press the carrier strip portions such as 18 against a corresponding tensioning roller 66. Also, a stripper blade 121 is provided that extends into a groove of the tensioning roller to insure separation of the carrier strip portions from roller 66. An alternative arrangement would be to put sprockets on the tensioning rollers engaging slits 226 and omit them on feed roller 64.

Figure 10:
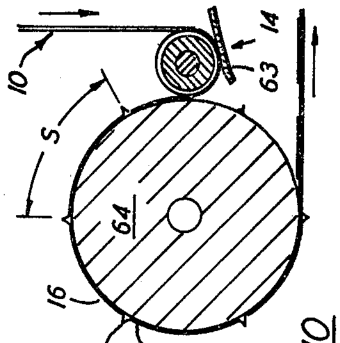
FIG. 10 is a view taken on the line 10—10 of FIG. 5.

At a first time in each cycle of operation, the bellows 74 descends against a label and begins moving forwardly with the label. In order for the labelling machine to operate properly, it is necessary that at the time the label strip be positioned so that there is a label at the position **14*p* shown in FIG. 5, which is the position at which the face of the bellows descends against the label. In order to accurately control the positions of the labels, the feed roll 64 is provided with sprockets 122 for engaging the label strip. As shown in FIGS. 5 and 10, the sprocket 122 are spaced about the feed roll by the distance S between the labels, and are designed to fit into the separation line 16 between the carrier strip portions and into the space or gap 15 between the labels. Thus, a label carrying arrangement or label strip forms its own sprocket holes at gaps 15 and the feed roll 64 is formed with sprockets that engage the sprocketholes of the label strip to control the positions of the labels in the machine. It may be noted that these sprocket holes at the gaps 15** between adjacent labels, arise automatically in the production of the label carrying arrangement, and it is not necessary to form special sprocket holes along edges of the backing strip to enable control of label position in the machine. Additional sprocket holes can be provided, however, to avoid contact of labels with sprockets.

Figure 6:
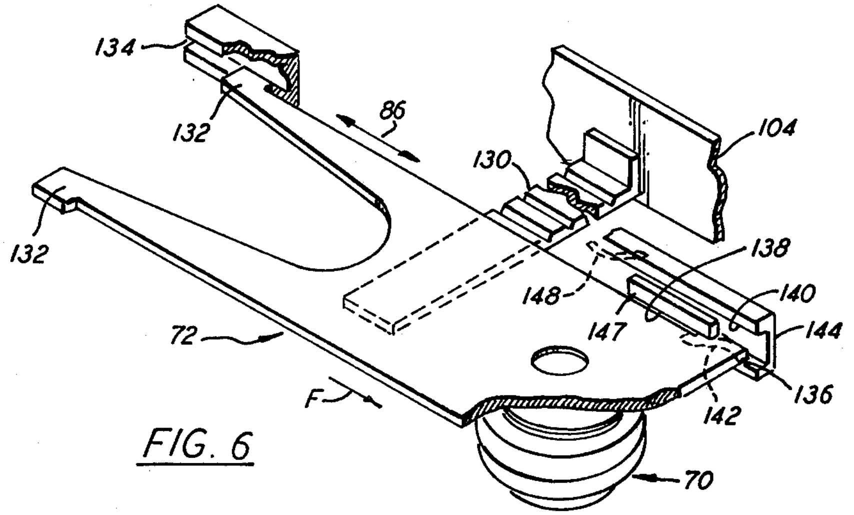
FIG. 6 is a partial perspective view of the apparatus of FIG. 4, showing sole of the details of the plunger carrying apparatus thereof.

As shown in FIGS. 6 and 7, the plunger apparatus 70 is moved back and forth by a tow bar 130 which has an inner end fixed to the slide 104 and an outer end fixed to the bellows-supporting plate 72. Although the primary motion of the bellows-supporting plate 72 is back and forth in the direction of arrows 86, it is also necessary to raise the forward end of the plate 72 which holds the bellows 74 during rearward motion of the bellows. This is to prevent the bellows from rubbing on the label strip during such rearward motion. The support plate 72 is guided by a pair of rearward tabs 132 which can move back and forth in guide slots 134 formed in guide ways 144 on the machine frame, while the front of the plate has a pair of tabs 136 which can move along either of two guide slots 138, 140 that are separated by a divider 147. When the support plate 72 moves slightly forward, in the direction of arrow F, from the position shown in FIG. 6, each of its forward tabs 136 which has been moving along the lower slot 138, becomes free to move up towards the level of upper slot 140. A forward spring 142 disposed along each of the guide ways 144, urges each tab 136 to move up, so that when the slide 72 moves rearwardly its tabs 136 slide at a higher level. As a result, the contracted bellows of the plunger apparatus 70 can move rearwardly to a position over a next label (**14*p* in FIG. 5) to be applied, without rubbing against the label strip. As the forward tabs 136 approach their rearward position, they pass rearward of the divider 147 that separates the upper and lower slots, and also pass under a rearward spring 148 that urges the tabs 136 downwardly. The tow bar 130 which moves the support plates 72** back and forth, has a series of slots cut into it, to provide increased flexibility, to permit the front portion of the support plate to move up and down a small distance as it moves back and forth.

The use of apparatus to move the label a distance beyond the separator edges before thrusting the label towards an article, avoids "hinging" of the label. Hinging is the phenomenon of the rear end of the label tending to stick to the separation edge or carrier strip, and therefore to tend to resist movement against an article to be labelled.

As described above, the application of vacuum and pressured air to the bellows through the hose 80 is controlled by the pressure control 82. As illustrated in FIG. 9, the pressure control 82 includes an air pressure inlet 150 through which pressured air is constantly applied, a vacuum inlet 152 to which a vacuum is constantly applied, and an outlet 154 which is coupled to the hose 80. A valve member 156 can move up and down to alternately couple the outlet 154 to either the air inlet 150 or the vacuum inlet 152. A rod 158 fixed to the valve member 156, is moved up and down by a cam 160 that is fixed to the drive shaft 100. The cam 160 is configured so that a vacuum is applied to the pressure control outlet 154 during the time when the bellows engages a label and moves with the label to a position opposite the article to be labelled. The cam is configured to then operate the valve member 156 so that pressured air is applied to the bellows to extend it briefly, near the end of its forward travel after which the vacuum is again applied to the pressure control outlet.

Figure 24:
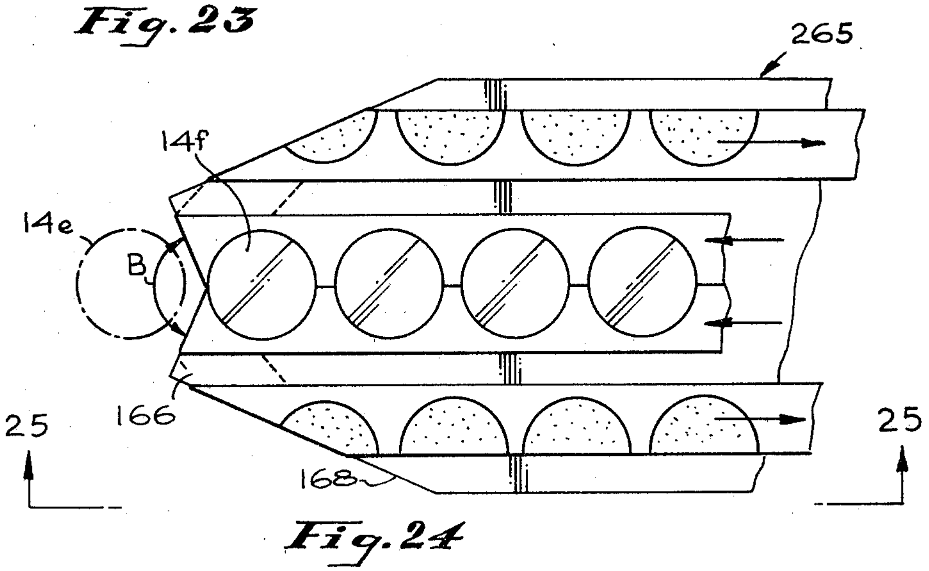
FIG. 24 is a partial plan view of a labelling system constructed in accordance with another embodiment of the invention.
Figure 25:
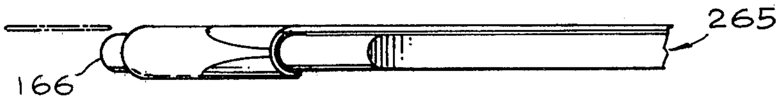
FIG. 25 is a view taken on the line 25—25 of FIG. 24.

The angle A (FIG. 5) of the V-shaped slot 24 is shown as being on the order of 90° for the labelling machine of FIGS. 1–9. If the labels 14 are spaced close to one another along the length of the carrier strip, then at the beginning of each cycle, the next label to be applied **14*p*, will be positioned with a considerable area 14*r* of its leading edge portion unsupported by the plate 22 or by any part of the carrier strip. Such exposure at the area 14*r* arises because the label strip 10 must have been advanced at the end of the previous cycle so that the previous label 14*t* was advanced clear of the carrier strip. The existence of an unsupported label region 14*r* is disadvantageous where very thin and flexible labels, such as one mil thick polyethylene labels, are utilized, because such labels are subject to fluttering or other disturbances due to the vacuum and air pressures applied in their vicinity, prior to the bellows face 78 making contact with the label. The existence of an unsupported label region 14*r*, (shown in FIG. 5) can be avoided by increasing the angle A of the V-shaped slot to a greater angle, such as from 90° to an angle B of 135°, as shown for the stripper 265 of FIGS. 24 and 25. This can allow a previous label 14*e* to have been moved clear of the guide plate 166 while the next label 14f has little or no region which is unsupported. By making the stripper 264** of a single piece of material and by maintaining its edges in the same plane, the strip portions do not slip sideways along the auxiliary edges. It may be noted that in a typical label strip, as with circular labels, the gap between adjacent labels is approximately ⅛ of an inch, and a large angle of at least 110° is required to avoid any unsupported label region at the next label to be applied while permitting the previous label to advance clear of the support plate.

Figure 16:
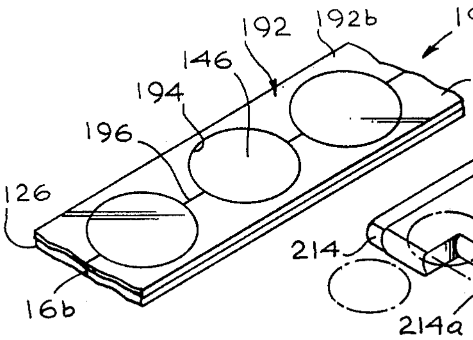
FIG. 16 is a partial perspective view of a label strip constructed in accordance with another embodiment of the invention, which includes a matrix surrounding the labels.

The separation technique utilized in the present invention, permits the utilization of a low cost label carrying arrangement or label strip of the type shown at 190 in FIG. 16. The label strip 190 is identical with label strip 10 of FIG. 1, except that it includes a scrim or matrix 192 surrounding the labels 14b and of the same material as the labels 14b. The matrix 192 is die cut to form separation lines 194 around each label and separation slits 196 which lie between the labels and over the separation lines 16b of the carrier strip 12b. In a typical prior art process for the production of the labels 14b, the labels are die cut from a strip of label material, with the cutting lines separating the strip of label material into label areas forming the labels 14b and a matrix area forming the matrix 192. Heretofore, the matrix area 192 had to be removed from around the labels 14b prior to packaging and selling the labels, because of the way labels were separated from the carrier web, i.e., bending the web around a sharp curve, around which the label would not follow. If the matrix material is left in place, because of the presence of fine bridging filaments of paper or adhesive between label and matrix material, which are still present despite die cutting, the label will not consistently separate or peel away from the carrying web. By utilizing the label strip 190 with the matrix 192 left on the carrier strip, the cost of the labels can be reduced since the cost of matrix removal is eliminated and matrices can be made thinner and of thinner paper stock, as can labels.

The matrix 192, which is divided into two portions by the separation slits 196, is pulled apart by the separation apparatus of the present invention, with each half of the matrix such as 192a, 192b moving with the carrier strip portion under it around the edges of the separation plate.

Figure 14:
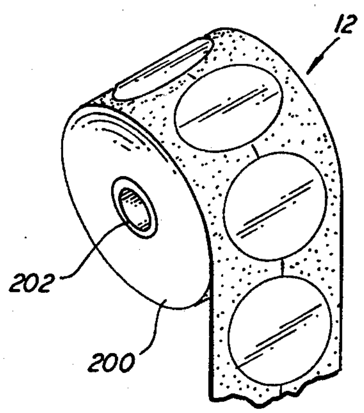
FIG. 14 is a perspective view of the label roll of the system of FIG. 4.
Figure 15:
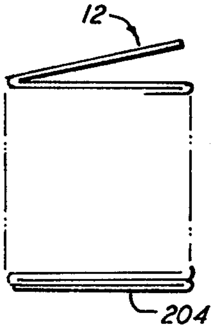
FIG. 15 is a front elevation view of a fan-folded label arrangement constructed in accordance with another embodiment of the invention.
Figure 17:
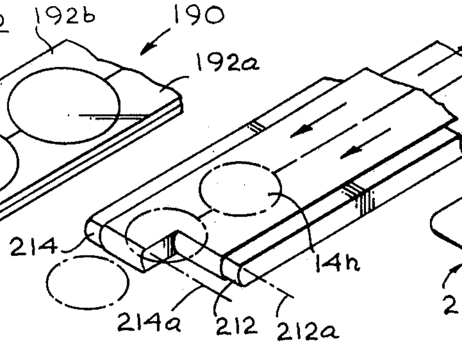
FIG. 17 is a perspective view of a step stripper apparatus constructed in accordance with another embodiment of the invention.
Figure 17A:
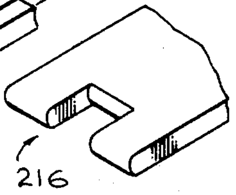
FIG. 17A is a perspective view of a stripper constructed in accordance with still another embodiment of the invention.

The labelling strip can be provided in different forms. As illustrated in FIG. 14, the label strip 12 can be provided as a roll 200 of many turns with a cardboard tube 202 at the center that fits onto a shaft of the labelling machine. FIG. 15 illustrates a fan-folded arrangement 204 of the labelling strip 12, which is used for producing computer printed labels. The apparatus for moving the carrier strip portions in different directions to separate them from one another and from the labels also can have a variety of forms. In the apparatus of FIG. 1, the separation edges which form a V-shaped notch, are nonaligned because the axes of the edges extend at an angle of less than 180° from one another, but with the axes of the edges substantially intersecting one another at the bottom of the V. In FIG. 17, a separation device 210 is illustrated which includes a pair of separation edges 212, 214 with their axes 212a, 214a also nonaligned, but with the axes of the edges extending parallel to one another but spaced from one another along the path of the labels 14h. This apparatus performs better than prior art separators which utilize just one edge around which a carrier strip is pulled, because in the present device only half of the carrier strip must be separated from the label at each separation edge. It may be noted that more than two separate carrier strip portions and a corresponding number of edge means can be provided, as in the separator 216 of FIG. 17A.

The moving of the labels in a positive manner towards the separation edges as by the feed roll 64 (FIG. 4), and in synchronism with pulling of the carrier strip portions by the tensioning rolls 66, 68, is important in minimizing the tention which must be applied to the carrier strip portions. By reducing the tension in the carrier strip portions required to pull them around the edges, the machine minimizes the possibility of tearing the carrier strip portions. The reduction in required tension is due to the "capstan effect" , which is the phenomenon that a rope wrapped about a capstan cannot be easily pulled if there is even a slight tension in the other end of the rope, but can be easily pulled if the other end of the rope is fed towards the capstan. The feed roll 64 serves to positively feed the label strip towards the separation edges in synchronism with the tensioning means pulling the carrier strip portions, so that the carrier strip is maintained under tension, but the machine operates properly with only a relatively small tension.

Figure 4:
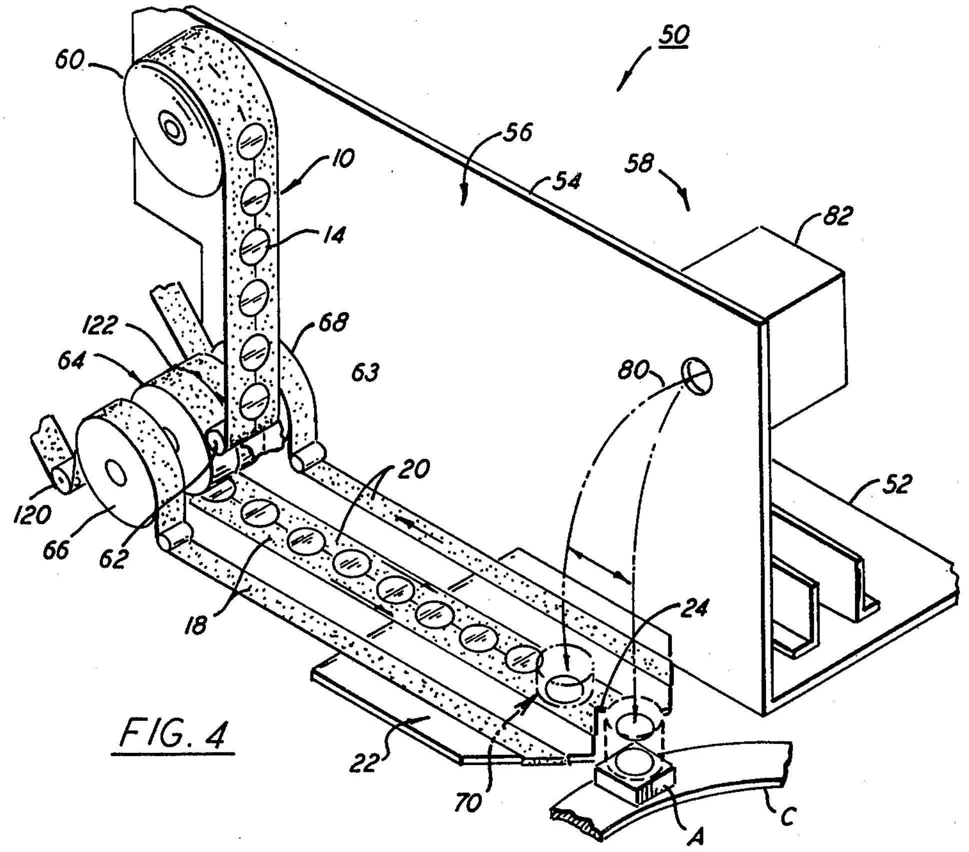
FIG. 4 is a more complete perspective view of the labelling system of FIG. 1.
Figure 18:
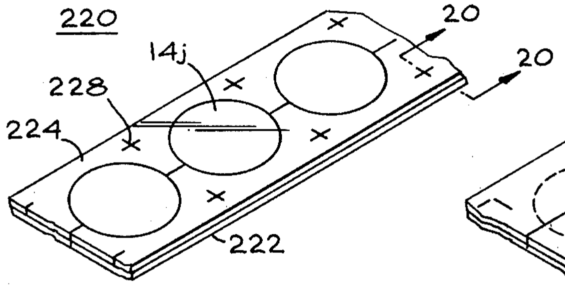
FIG. 18 is a partial perspective top view of a label strip constructed in accordance with another embodiment of the invention.
Figure 19:
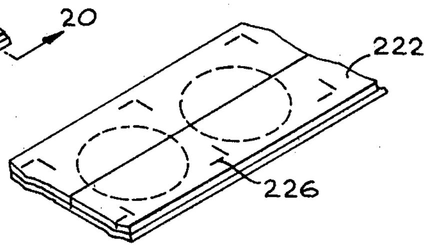
FIG. 19 is a partial perspective bottom view of a label strip of FIG. 18.
Figure 21:
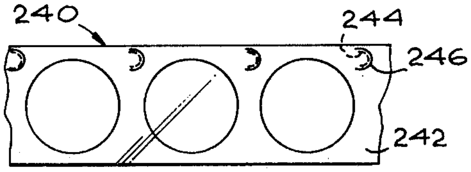
FIG. 21 is a partial plan view of a label strip constructed in accordance with another embodiment of the invention.
Figure 20:
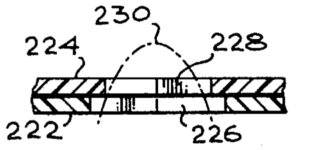
FIG. 20 is a view taken on the line 20—20 of FIG. 18.

In the apparatus of FIG. 4, the positive feeding of the label strip is accomplished by the roll 64 which has the thin sprockets 122 that project through the separation line of the carrier strip and into the gap between adjacent labels. The thin sprockets could damage the labels if more than a small force is applied to the label strip. To avoid this, other sprocket holes can be formed in the label strip. FIGS. 18–20 illustrate a label strip 220 which includes a carrier strip 222, labels 14j, and a matrix 224 of label material, wherein both the carrier strip 222 and matrix 224 have cuts in them for receiving sprockets. Cuts 228 in the matrix and cuts 226 in the carrier which lie under the cut regions of the matrix, form weakened regions which can be easily penetrated by sprockets such as that indicated at 230. The cuts 226, 228 can be formed without producing confetti-like waste which would have to be removed from the cutting machine. FIG. 21 illustrates still another label strip 240, which includes a matrix 242 over a carrier strip, and with tabs 244 cut in the carrier strip and overlying tabs 246 cut in the matrix, for receiving sprockets. It is also possible to form cuts or holes only in the carrier strip, but near the edge of the carrier strip, so that sprockets can pass through the carrier strip and merely press the edges of the matrix away from the carrier strip. All these cuts can also be in the label area if necessary.

Figure 26:
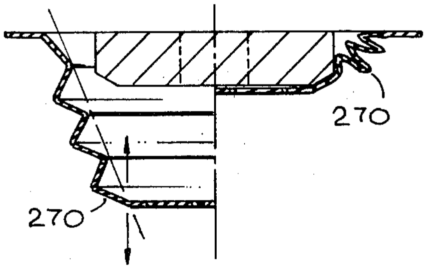
FIGS. 26 and 27 are respectively cross-sectional views of a preferred bellows shape illustrating it at three stages of operation.
Figure 27:
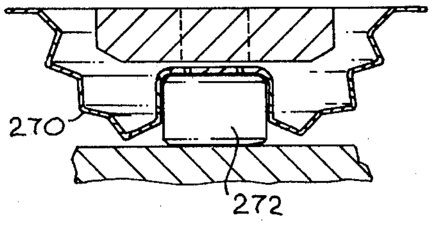
Figure 22:
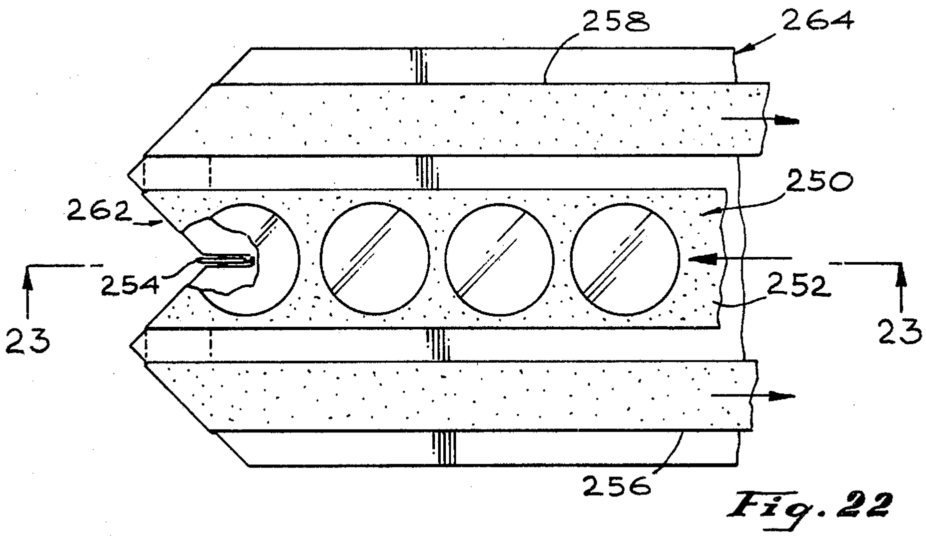
FIG. 22 is a partial plan view of a label strip and stripper system constructed in accordance with another embodiment of the invention.
Figure 23:
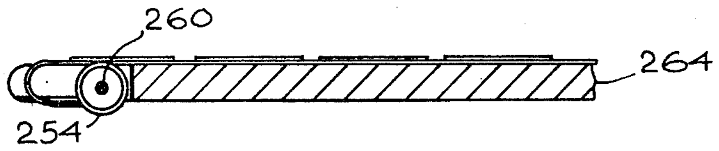
FIG. 23 is a view taken on the line 23—23 of FIG. 22.

FIGS. 22 and 23 illustrate a portion of a label applying apparatus which can utilize a label strip 250 which is initially supplied with a carrier strip 252 that does not have a separation line therein, but which still utilizes the inventive feature of this invention of separating the carrier strip from the label by pulling different portions of the carrier strip along different paths. In the apparatus of FIGS. 22 and 23, this is accomplished by utilizing a slitter 254 which slits the carrier strip to permit two portions 256, 258 of the carrier strip to be pulled in different directions. The slitter 254 is a thin disc rotatably mounted on a shaft 260 and located at the bottom of the notch 262 of the separator plate 264. The top of the slitter disc 254 can be located approximately even with the upper surface of the plate 264, although it could be located slightly above or below it. The slitter also can be located a distance up-path from the bottom of the V-notch 262, to slit the carrier strip a distance prior to its reaching the V-notch. FIG. 26 and FIG. 27 are cross sectional views of a preferred bellows shape. FIG. 26 actually is a split view with the left half showing the bellows 270 when its interior is at atmospheric pressure. It will be seen that the bellows may have the form of the frustum of a cone or a pyramid. The right side of FIG. 26 shows the bellows 270 when fully retracted, as happens when a vacuum is established in its interior. FIG. 27 shows the bellows 270 when fully extended and applying a label to an object 272.

The reason the form shown is preferred is because, upon retraction of the bellows as in FIG. 26, there is no sticking together of the folds. This occurs with the usual cylindrical or square shaped bellows. Upon expansion thereafter the bellows may not extend fully or extend with the base at an angle, thus defeating label application. Furthermore, because of the frustum of a cone shape, the bellows, when extended against an object, as shown in FIG. 26, wraps itself partially around the object, insuring proper label placement.

Thus, the invention provides a new label carrying arrangement or label strip, and a separation apparatus for separating the labels from the carrier strip, to permit the highly reliable separation of labels from the strip while permitting the use of a wide variety of labels including very thin and flexible labels.

By utilizing this invention, the label carrying web is made far less expensive to manufacture (as much as 30%). Labels can now be made of material of extreme thinness and flexibility (0.001′ soft polyethylene, for example). The peeling process is 100% positive. The label must separate when the carrier web passes through the V-shaped notch. Furthermore, the process of peeling does not require any appreciable tension of the web.

The label is held by the application plunger before, during and after the peeling process, so that, in one sense, the label does not have to be transferred to any place after peeling, because it is already in that place.

The method of label application is a pneumatically-actuated bellows which holds the label firmly by vacuum until extended by a blast of low pressure air. It can apply labels over a wide range of product height variation, is extremely fast (about 2.6 milliseconds), is conformable to product shapes, and can easily label products going by at high speed (24″ per second) without damage.

Another advantageous characteristic of the new labelling system is the elimination of any electronic label sensing or electromechanical web drives, which must be sophisticated for high speeds and therefore expensive and inclined to failure. The elimination of such label sensing and web drive systems is possible due to the use of various slits in the label carrying web, which are employed somewhat like sprocket holes, by the machine, to control the advance and location of the labels within the machine. They are available at no cost because of their special design which is only suited for the kind of die cutting used to make pressure sensitive labels.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An elongated label strip suitable for use with motor driven first and second sprocket rollers for sequentially delivering labels to a mechanism operable to apply each delivered label to an object conveyed therepast, said label strip comprising:

first and second elongated carrier strip portions, each having first and second elongated edges, said carrier strip portions being positioned parallel to and closely spaced from one another to define a separation line between adjacent edges of said respective carrier strip portions;

said first carrier strip portion defining a plurality of uniformly spaced cuts therein aligned parallel to said separation line for cooperatively receiving the sprockets of said first roller;

said second carrier strip portion defining a plurality of uniformly spaced cuts therein aligned parallel to said separation line for cooperatively receiving the sprockets of said second roller; and a multiplicity of labels carried by and spaced along said carrier strip portions with each label being releasably adhered to both said first and second carrier strip portions so as to bridge said separation line therebetween.

2. The label strip of claim 1 wherein each of said uniformly spaced cuts in said first carrier strip portion comprises a thin slit elongated in a direction parallel to said separation line for cooperatively receiving a thin sprocket carried by said first roller; and wherein each of said uniformly spaced cuts in said second carrier strip portion comprises a thin slit elongated in a direction parallel to said separation line for cooperatively receiving a thin sprocket carried by said second roller.

3. The label strip of claim 1 including a matrix of the same material as said labels substantially surrounding said labels and adhered to both said first and second carrier strip portions.

4. The label strip of claim 3 wherein said matrix is comprised of first and second parallel matrix portions spaced by a separation slit.

* * * * *